United States Patent
Vandergon et al.

(10) Patent No.: US 9,993,934 B2
(45) Date of Patent: Jun. 12, 2018

(54) LIQUID PRESSURIZATION PUMP AND SYSTEMS WITH DATA STORAGE

(71) Applicant: Hypertherm, Inc., Hanover, NH (US)

(72) Inventors: Cedar J. Vandergon, New Brighton, MN (US); Jon W. Lindsay, Hanover, NH (US); Steve E. Voerding, New Brighton, MN (US); Brett A. Hansen, Mapleton, UT (US)

(73) Assignee: Hyperthem, Inc., Hanover, NH (US)

( * ) Notice: Subject to any disclaimer, the term of this patent is extended or adjusted under 35 U.S.C. 154(b) by 425 days.

(21) Appl. No.: 14/641,897

(22) Filed: Mar. 9, 2015

(65) Prior Publication Data
US 2015/0251331 A1    Sep. 10, 2015

Related U.S. Application Data

(60) Provisional application No. 61/949,922, filed on Mar. 7, 2014.

(51) Int. Cl.
*B26F 3/00* (2006.01)
*G06Q 10/00* (2012.01)
(Continued)

(52) U.S. Cl.
CPC .............. *B26F 3/004* (2013.01); *F04B 49/00* (2013.01); *F04B 49/10* (2013.01);
(Continued)

(58) Field of Classification Search
CPC .......... B26F 3/004; F04B 49/00; F04B 49/10; G06Q 10/1097; G06Q 10/20; Y10T 83/364
(Continued)

(56) References Cited

U.S. PATENT DOCUMENTS

| | | |
|---|---|---|
| 2,985,050 A | 5/1961 | Schwacha |
| 3,018,360 A | 1/1962 | Engel |
| | (Continued) | |

FOREIGN PATENT DOCUMENTS

| | | |
|---|---|---|
| CA | 2439213 B1 | 10/2006 |
| EP | 0508482 A2 | 10/1992 |
| | (Continued) | |

OTHER PUBLICATIONS

Trumpf Press Release, New RFID lens provides LensLine sensor system with improved condition checking capabilities, online press release available at http://www.trumpf.com/nc/en/press/press-releases/press-release/rec-uid/266044.html, Aug. 12, 2013. (4 pages).
(Continued)

*Primary Examiner* — Omar Flores Sanchez
(74) *Attorney, Agent, or Firm* — Proskauer Rose LLP

(57) ABSTRACT

The invention features methods and apparatuses for determining replacement of components in liquid pressurization systems. A replaceable component for use in a pump of a liquid pressurization system includes a body portion and a data storage mechanism. The data storage mechanism is in physical contact with the body portion. The data storage mechanism is configured to communicate information to a reader of the liquid pressurization system. The information is usable to determine a condition of replacement (e.g., a remaining usable life) of the replaceable component.

34 Claims, 8 Drawing Sheets

(51) Int. Cl.
  *G06Q 10/10* (2012.01)
  *F04B 49/10* (2006.01)
  *F04B 49/00* (2006.01)

(52) U.S. Cl.
  CPC ......... *G06Q 10/1097* (2013.01); *G06Q 10/20* (2013.01); *Y10T 83/364* (2015.04)

(58) Field of Classification Search
  USPC ...................................................... 83/98–99
  See application file for complete search history.

(56) References Cited

U.S. PATENT DOCUMENTS

| | | | |
|---|---|---|---|
| 3,010,012 A | 11/1964 | Tuthill | |
| 3,518,401 A | 6/1970 | Mathews | |
| 3,602,683 A | 8/1971 | Hishida et al. | |
| 4,125,754 A | 11/1978 | Wasserman et al. | |
| 4,497,029 A | 1/1985 | Kiyokawa | |
| 4,519,835 A | 5/1985 | Gauvin et al. | |
| 4,588,880 A | 5/1986 | Hesser | |
| 4,733,052 A | 3/1988 | Nilsson et al. | |
| 4,742,470 A | 5/1988 | Juengel | |
| 5,018,670 A | 5/1991 | Chalmers | |
| 5,050,106 A | 9/1991 | Yamamato et al. | |
| 5,086,655 A | 2/1992 | Fredericks et al. | |
| 5,099,226 A | 3/1992 | Andrews | |
| 5,248,867 A | 9/1993 | Ohba et al. | |
| 5,309,683 A | 5/1994 | Hockett | |
| 5,357,076 A | 10/1994 | Blankenship | |
| 5,381,487 A | 1/1995 | Shamos | |
| 5,388,965 A | 2/1995 | Fehn | |
| 5,390,964 A | 2/1995 | Gray, Jr. | |
| 5,400,389 A | 3/1995 | Niiyama et al. | |
| 5,440,477 A | 8/1995 | Rohrberg et al. | |
| 5,500,512 A | 3/1996 | Goldblatt | |
| 5,556,562 A | 9/1996 | Sorenson | |
| 5,653,264 A | 8/1997 | Atkinson | |
| 5,717,187 A | 2/1998 | Rogozinski et al. | |
| 5,860,849 A | 1/1999 | Miller | |
| 5,994,663 A | 11/1999 | Lu | |
| 6,047,579 A | 4/2000 | Schmitz | |
| 6,130,407 A | 10/2000 | Villafuerte | |
| 6,133,542 A | 10/2000 | Dvorak et al. | |
| 6,201,207 B1 | 3/2001 | Maruyama et al. | |
| 6,248,975 B1 | 6/2001 | Lanouette et al. | |
| 6,259,059 B1 | 7/2001 | Hsu | |
| 6,267,291 B1 | 7/2001 | Blankenship et al. | |
| 6,326,583 B1 | 12/2001 | Hardwick et al. | |
| 6,409,476 B2 | 6/2002 | Mills | |
| 6,479,793 B1 | 11/2002 | Wittmann et al. | |
| 6,510,984 B2 | 1/2003 | Blankenship et al. | |
| 6,539,813 B1 | 4/2003 | Horiuchi et al. | |
| 6,563,085 B2 | 5/2003 | Lanouette et al. | |
| 6,657,162 B1 | 12/2003 | Jung et al. | |
| 6,659,098 B1 | 12/2003 | Sekiya | |
| 6,693,252 B2 | 2/2004 | Zhang et al. | |
| 6,707,304 B2 | 3/2004 | Buhler et al. | |
| 6,717,096 B2 | 4/2004 | Hewett et al. | |
| 6,729,468 B1 | 5/2004 | Dobmeier | |
| 6,772,040 B1 | 8/2004 | Picard et al. | |
| 6,781,085 B2 | 8/2004 | Ulrich et al. | |
| 6,933,462 B2 | 8/2005 | Iriyama et al. | |
| 6,960,737 B2 | 11/2005 | Tatham | |
| 6,980,704 B2 | 12/2005 | Kia et al. | |
| 6,992,262 B2 | 1/2006 | Matus et al. | |
| 6,995,545 B2 | 2/2006 | Tracy et al. | |
| 7,030,337 B2 | 4/2006 | Baker et al. | |
| 7,032,814 B2 | 4/2006 | Blankenship | |
| 7,115,833 B2 | 10/2006 | Higgins et al. | |
| 7,186,944 B2 | 3/2007 | Matus et al. | |
| 7,307,533 B2 | 12/2007 | Ishii | |
| 7,358,458 B2 | 4/2008 | Daniel | |
| 7,375,302 B2 | 5/2008 | Twarog et al. | |
| 7,411,154 B2 | 8/2008 | Fosbinder et al. | |
| 7,645,960 B2 | 1/2010 | Stava | |
| 7,671,294 B2 | 3/2010 | Belashchenko et al. | |
| 7,680,625 B2 | 3/2010 | Trowbridge et al. | |
| 7,755,484 B2 | 7/2010 | Cullen et al. | |
| 7,843,334 B2 | 11/2010 | Kumagai et al. | |
| 8,035,487 B2 | 10/2011 | Malackowski | |
| 8,085,150 B2 | 12/2011 | Oberle | |
| 8,141,240 B2 | 3/2012 | Hiew et al. | |
| 8,203,095 B2 | 6/2012 | Storm et al. | |
| 8,204,618 B2 | 6/2012 | Young, Jr. et al. | |
| 8,242,907 B2 | 8/2012 | Butler et al. | |
| 8,263,896 B2 | 9/2012 | Schneider | |
| 8,272,794 B2 | 9/2012 | Silchenstedt et al. | |
| 8,278,588 B2 | 10/2012 | Salsich et al. | |
| 8,316,742 B2 | 11/2012 | Craig | |
| 8,373,084 B2 | 2/2013 | Salsich | |
| 8,376,671 B2 | 2/2013 | Kaneko | |
| 8,395,076 B2 | 3/2013 | Matus | |
| 8,431,862 B2 | 4/2013 | Kachline | |
| 8,620,738 B2 | 12/2013 | Fordyce, III et al. | |
| 8,658,941 B2 | 2/2014 | Albrecht | |
| 8,686,318 B2 | 4/2014 | Albrecht | |
| 8,748,776 B2 | 6/2014 | Albrecht et al. | |
| 8,759,715 B2 | 6/2014 | Narayanan et al. | |
| 8,766,132 B2 | 7/2014 | Blankenship et al. | |
| 8,859,828 B2 | 10/2014 | Liu et al. | |
| 8,859,928 B2 | 10/2014 | Summerfeld | |
| 9,031,683 B2 | 5/2015 | Elfstrom et al. | |
| 9,129,330 B2 | 9/2015 | Albrecht et al. | |
| 9,229,436 B2 | 1/2016 | Stumpfl et al. | |
| 2002/0117484 A1 | 8/2002 | Jones et al. | |
| 2003/0025598 A1 | 2/2003 | Wolf et al. | |
| 2003/0094487 A1 | 5/2003 | Blankenship et al. | |
| 2003/0148709 A1 | 8/2003 | Anand et al. | |
| 2004/0004064 A1 | 1/2004 | Lanouette et al. | |
| 2004/0031776 A1 | 2/2004 | Gevelber et al. | |
| 2004/0106101 A1 | 6/2004 | Evans | |
| 2004/0193307 A1 | 9/2004 | Fujishima et al. | |
| 2005/0045599 A1 | 3/2005 | Matus | |
| 2005/0109738 A1 | 5/2005 | Hewett et al. | |
| 2005/0145688 A1 | 7/2005 | Milenkovic et al. | |
| 2005/0173390 A1 | 8/2005 | Lanouette et al. | |
| 2006/0006154 A1 | 1/2006 | Koike | |
| 2006/0070986 A1 | 4/2006 | Ihde et al. | |
| 2006/0163228 A1 | 7/2006 | Daniel | |
| 2006/0163230 A1 | 7/2006 | Kaufman | |
| 2006/0201923 A1 | 9/2006 | Hutchison | |
| 2006/0289406 A1 | 12/2006 | Helenius et al. | |
| 2007/0012099 A1 | 1/2007 | Becourt | |
| 2007/0051711 A1 | 3/2007 | Kachline | |
| 2007/0080149 A1 | 4/2007 | Albrecht | |
| 2007/0080150 A1 | 4/2007 | Albrecht | |
| 2007/0080151 A1 | 4/2007 | Albrecht | |
| 2007/0080152 A1 | 4/2007 | Albrecht | |
| 2007/0080153 A1 | 4/2007 | Albrecht et al. | |
| 2007/0294608 A1 | 12/2007 | Winterhalter et al. | |
| 2008/0001752 A1 | 1/2008 | Bruns | |
| 2008/0011821 A1 | 1/2008 | Ellender et al. | |
| 2008/0061049 A1 | 3/2008 | Albrecht | |
| 2008/0066596 A1 | 3/2008 | Yamaguchi | |
| 2008/0093476 A1 | 4/2008 | Johnson et al. | |
| 2008/0149608 A1 | 6/2008 | Albrecht | |
| 2008/0149686 A1 | 6/2008 | Daniel et al. | |
| 2008/0156783 A1 | 7/2008 | Vanden Heuvel | |
| 2008/0223952 A1 | 9/2008 | Wernli et al. | |
| 2008/0257874 A1 | 10/2008 | Kaufman et al. | |
| 2008/0308641 A1 | 12/2008 | Finn | |
| 2009/0008370 A1 | 1/2009 | Salsich et al. | |
| 2009/0057286 A1 | 3/2009 | Ihara et al. | |
| 2009/0065489 A1 | 3/2009 | Duffy | |
| 2009/0107960 A1 | 4/2009 | Hampton | |
| 2009/0152255 A1 | 6/2009 | Ma | |
| 2009/0159572 A1 | 6/2009 | Salsich | |
| 2009/0159575 A1 | 6/2009 | Salsich | |
| 2009/0163130 A1 | 6/2009 | Zambergs | |
| 2009/0184098 A1 | 7/2009 | Daniel et al. | |
| 2009/0212027 A1 | 8/2009 | Borowy et al. | |
| 2009/0219136 A1 | 9/2009 | Brunet et al. | |
| 2009/0222804 A1 | 9/2009 | Kaufman | |
| 2009/0230097 A1 | 9/2009 | Liebold et al. | |

(56) References Cited

U.S. PATENT DOCUMENTS

| | | |
|---|---|---|
| 2009/0240368 A1 | 9/2009 | Young, Jr. et al. |
| 2009/0288532 A1 | 11/2009 | Hashish |
| 2010/0084381 A1 | 4/2010 | Indraczek et al. |
| 2010/0155377 A1 | 6/2010 | Lindsay et al. |
| 2010/0324868 A1 | 12/2010 | Russell et al. |
| 2011/0000893 A1 | 1/2011 | Blankenship et al. |
| 2011/0029385 A1 | 2/2011 | Engel et al. |
| 2011/0114616 A1 | 5/2011 | Albrecht |
| 2011/0163857 A1 | 7/2011 | August et al. |
| 2011/0220630 A1 | 9/2011 | Speilman et al. |
| 2011/0294401 A1 | 12/2011 | Habermann et al. |
| 2012/0021676 A1 | 1/2012 | Schubert et al. |
| 2012/0138583 A1 | 6/2012 | Winn et al. |
| 2012/0139692 A1 | 6/2012 | Neubauer et al. |
| 2012/0234803 A1 | 9/2012 | Liu et al. |
| 2012/0241428 A1 | 9/2012 | Kowaleski |
| 2012/0247293 A1 | 10/2012 | Nagai et al. |
| 2013/0264320 A1 | 1/2013 | Horvat |
| 2013/0068732 A1 | 3/2013 | Watson et al. |
| 2013/0179241 A1 | 7/2013 | Liu |
| 2013/0210319 A1 | 8/2013 | Gramling et al. |
| 2013/0253728 A1 | 9/2013 | Stumpfl et al. |
| 2013/0263420 A1 | 10/2013 | Shipulski |
| 2013/0264317 A1 | 10/2013 | Hoffa et al. |
| 2014/0069895 A1 | 3/2014 | Brine et al. |
| 2014/0116217 A1* | 5/2014 | Hashish .................. B24C 5/02 83/177 |
| 2014/0335761 A1 | 11/2014 | Chou et al. |
| 2015/0108223 A1 | 4/2015 | Weitzhandler |
| 2015/0371129 A1 | 12/2015 | Hoffa et al. |
| 2017/0042011 A1 | 2/2017 | Sanders et al. |
| 2017/0042012 A1 | 2/2017 | Sanders et al. |
| 2017/0046544 A1 | 2/2017 | Ikemoto |
| 2017/0091634 A1* | 3/2017 | Ritter .................... G06N 5/045 |

FOREIGN PATENT DOCUMENTS

| | | |
|---|---|---|
| EP | 1065620 | 1/2001 |
| EP | 1117279 A1 | 7/2001 |
| EP | 1288016 | 3/2003 |
| EP | 1516688 A1 | 3/2005 |
| EP | 1522371 A1 | 4/2005 |
| JP | S6163368 | 4/1986 |
| JP | H05154732 A | 6/1993 |
| JP | H11285831 A | 10/1999 |
| JP | 2003025176 A | 1/2003 |
| JP | 2003048134 A | 2/2003 |
| JP | 2009252085 A | 10/2009 |
| JP | 2012048287 A | 3/2012 |
| JP | 2012079221 A | 4/2012 |
| WO | 2013151602 | 4/1986 |
| WO | 2008144785 B2 | 12/2008 |
| WO | 2009/142941 A2 | 11/2009 |
| WO | 2010142858 B3 | 12/2010 |
| WO | 20130000700 B4 | 1/2013 |
| WO | 2013151886 | 10/2013 |

OTHER PUBLICATIONS

Torchmate Arc Voltage Torch Height Control—Operation Manual, Applied Robotics, Inc., Oct. 2005, pp. 1-19.

* cited by examiner

LIQUID PRESSURIZATION PUMP AND SYSTEMS WITH DATA STORAGE

CROSS REFERENCE TO RELATED APPLICATIONS

This application is a non-provisional of U.S. Provisional Patent Application No. 61/949,922, filed on Mar. 7, 2014 and entitled "Waterjet Intensifier Pump and Systems with RFID." The contents of this application are incorporated herein by reference in their entirety.

FIELD OF THE INVENTION

The invention relates generally to the field of liquid pressurization systems and processes. More specifically, the invention relates to methods and apparatuses for determining replacement schemes for components of liquid pressurization systems.

BACKGROUND

Liquid pressurization systems produce high pressure (e.g., up to 90,000 pounds per square inch or greater) streams of liquid for various applications. For example, high pressure liquid may be delivered to a liquid jet cutting head, a cleaning tool, a pressure vessel or an isostatic press. In the case of liquid jet cutting systems, liquid is forced through a small orifice at high velocity to concentrate a large amount of energy on a small area. To cut hard materials, a liquid jet can be "abrasive" or include abrasive particles for increasing cutting ability. As used herein, the term "liquid jet" includes any substantially pure water jet, liquid jet, and/or slurry jet. However, one of ordinary skill in the art would easily appreciate that the invention applies equally to other systems that use liquid pumps or similar technology.

Many key components of pumps for liquid pressurization systems require frequent maintenance or replacement. For example, common failure modes in liquid pressurization pumps include: leaking of seal assemblies and plunger hydraulic seals; fatigue failures of high pressure cylinders, check valves, proximity switches, and attenuators; and wearing of bleed down valves due to repeated venting of high pressure water in the pump at shut down. Currently, each time a key component of a liquid pressurization pump fails, a pump operator must disable the pump to perform repairs, causing the system to suffer substantial down time. Usage hours for key system components are currently tracked manually, but manual tracking suffers from significant drawbacks. First, manual tracking is time-consuming and cumbersome, particularly when many replaceable components must be monitored. Second, manual tracking does not effectively minimize system down time. What is needed is a liquid pressurization system that efficiently tracks usage of key system components, predicts failure modes in advance of system failure, and optimizes replacement schedules to minimize system down time.

SUMMARY OF THE INVENTION

The present invention streamlines the pump component replacement process by fitting replaceable pump components with data storage devices that contain information usable to determine a condition of replacement (e.g., a useful remaining life) of each replaceable component. Usage information can be written to a data storage device or stored remotely. For example, usage information can be written to radio frequency identification (RFID) tags included on key pump components, and RFID readers can be used to read the information and monitor component usage. Accumulated usage information can be compared to tabulated information indicating the expected lives for specific replaceable components along relevant usage metrics (e.g., hours of usage).

A user alert can be generated when one or more key components approaches the end of its expected life. The usage information can be used to determine optimized batch replacement schedules for key components (e.g., by replacing multiple components that are near the end of life at the same batch replacement) to minimize system down time and improve preventive maintenance. The invention enables storing of information relating to a condition of replacement for a replaceable component and/or automatic tracking of information relating to a condition of replacement of the replaceable component. Thus, a component can be removed from the system and re-installed at a later date with accurate tracking. Storing expected life data directly on the replaceable component may be especially helpful over time as part designs improve expected life. When an improved part is installed, the tracking system can automatically adjust accordingly.

In one aspect, the invention features a replaceable component for use in a pump of a liquid pressurization system. The replaceable component includes a body portion. The replaceable component includes a data storage mechanism in physical contact with the body portion. The data storage mechanism is configured to communicate information to a reader of the liquid pressurization system. The information is usable to determine a condition of replacement of the replaceable component.

In some embodiments, the condition of replacement is a remaining usable life (e.g., measured in hours of operation or another suitable metric). In some embodiments, the replaceable component is one of a seal assembly, a check valve, a hydraulic seal cartridge, or a cylinder. In some embodiments, the replaceable component is for use in a liquid jet cutting system, an isostatic press or a pressure vessel. In some embodiments, the information denotes a type replaceable component.

In some embodiments, the data storage mechanism is a radio frequency identification mechanism. In some embodiments, the data storage mechanism is configured to record a number of pressure cycles to which the replaceable component has been exposed. In some embodiments, the information includes a period of use for the replaceable component. In some embodiments, the information includes a condition of use for the replaceable component. In some embodiments, the data storage mechanism is configured to automatically set at least one operating parameter of the liquid jet cutting system. In some embodiments, the body portion includes a connection mechanism for coupling the body portion to the liquid jet cutting system.

In some embodiments, the data storage mechanism is located in a low pressure region of the replaceable component. In some embodiments, the replaceable component includes a sensor. In some embodiments, the sensor is a temperature sensor. In some embodiments, the reader is configured to write to the data storage mechanism. In some embodiments, the data storage mechanism stores specific values of an operating condition over time. In some embodiments, the operating condition is one of temperature, pressure, leakage, moisture information and number of pressure or operational cycles. In some embodiments, the information comprises at least one of temperature, pressure, a number of operational cycles, a time of operation, a number of pump starts, or a measure of detected strain on the replaceable component.

In another aspect, the invention features a replaceable component for use in a pump of a liquid jet cutting system. The replaceable component includes a body portion configured to assist in producing a liquid jet. The replaceable component includes a data storage mechanism located in or on the body portion of the replaceable component. The data storage mechanism is configured to communicate information to a reader of the liquid jet cutting system. The information is usable to determine a replacement status for the replaceable component. The replaceable component is at least one of a cylinder, a check valve, a hydraulic seal housing, a plunger bearing, an output adaptor, a proximity switch, an attenuator, a bleed down valve, an indicator pin, a dynamic seal cartridge, a cutting head adapter, or an on/off valve body.

In another aspect, the invention features a liquid pressurization system. The liquid pressurization system includes a tool for delivering a pressurized liquid. The liquid pressurization system includes a pump fluidly connected to the tool. The pump includes a replaceable component having a data storage mechanism including information about the replaceable component. The pump includes a reader in communication with the data storage mechanism for reading the information. The pump includes a computing device in communication with the reader. The computing device determines a replacement schedule for the replaceable component based on the information.

In some embodiments, the reader is configured to write data to the data storage mechanism. In some embodiments, the computing device includes at least one of a computer numerical controller or a pump programmable logic controller. In some embodiments, the computing device is configured to adjust operating parameters of the liquid jet cutting system based on the information. In some embodiments, the computing device is configured to identify the replaceable component based on the information. In some embodiments, the replaceable component includes at least one of a cylinder, a check valve, a plunger bearing, an output adaptor, a proximity switch, a hydraulic seal housing, an attenuator, a bleed down valve, an indicator pin, a dynamic seal cartridge, a cutting head adapter, or an on/off valve body.

In some embodiments, the data storage mechanism is a radio frequency identification mechanism. In some embodiments, the tool is a cutting head. In some embodiments, the tool is a cleaning device. In some embodiments, the information denotes a type of replaceable component. In some embodiments, the information includes a time of use of the replaceable component. In some embodiments, the liquid pressurization system includes a connector disposed on the pump and connected to the reader. The connector can be configured to transmit the information to a computer numeric controller of the liquid jet cutting system. In some embodiments, the connector is further configured to convert the information from an analog format to a digital format.

In some embodiments, the liquid pressurization system includes an intensifier operably connected to the pump. In some embodiments, the liquid pressurization system includes an accumulator fluidly connected to the intensifier. In some embodiments, the liquid pressurization system includes a replacement schedule that is coordinated with replacement schedules of other replaceable components of the liquid jet cutting system. In some embodiments, the liquid pressurization system includes a second replaceable component. The second replaceable component includes a second data storage mechanism. The second data storage mechanism is in communication with the reader. In some embodiments, the liquid pressurization system includes two-way communication.

In another aspect, the invention features a method of scheduling a service event for a liquid pressurization system. The method includes providing a liquid pressurization system with a replaceable component including a data storage device. The method includes tracking usage information of the replaceable component using the data storage device. The method includes generating a notification based on the usage information of the liquid pressurization system when the replaceable component approaches the life expectancy.

In some embodiments, the method includes comparing usage information of the replaceable component of the liquid pressurization system to life expectancy information for the replaceable component. In some embodiments, the notification is generated after the replaceable component expends at least 90% of the life expectancy. In some embodiments, the method includes (i) providing a plurality of replaceable components on or in the liquid pressurization system, each replaceable component including a device for tracking usage information for each replaceable component; and/or (ii) planning an outage of the liquid pressurization system based on usage information for the plurality of replaceable components. In some embodiments, the method includes determining whether each of the plurality of replaceable components should be replaced based on the usage information for each respective component.

BRIEF DESCRIPTION OF THE DRAWINGS

The foregoing discussion will be understood more readily from the following detailed description of the invention when taken in conjunction with the accompanying drawings.

DETAILED DESCRIPTION OF THE DRAWINGS

Figure 1:
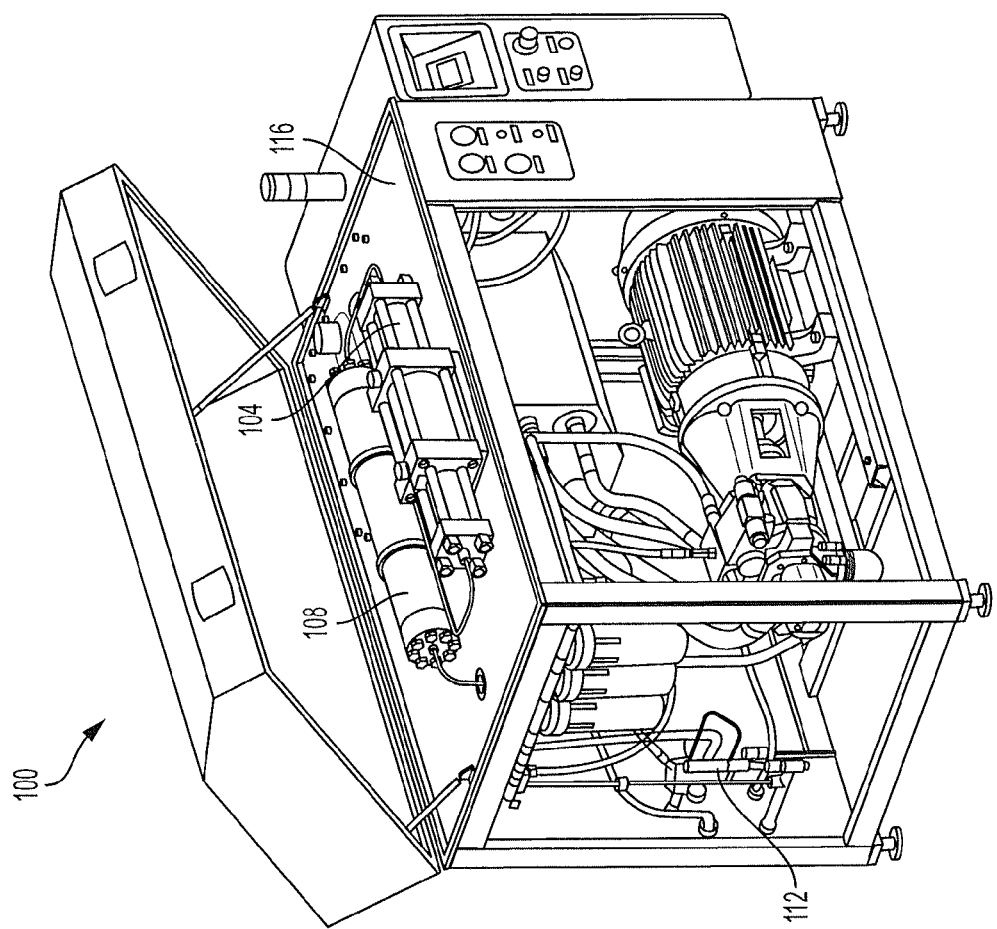
FIG. 1 is a schematic illustration of a pump for a liquid pressurization system, according to an illustrative embodiment of the invention.

FIG. 1 is a schematic illustration of a pump 100 for a liquid pressurization system, according to an illustrative embodiment of the invention. The pump 100 includes an intensifier pump 104, an attenuator 108, a bleed down valve 112 and a top deck 116. The intensifier pump 104 draws liquid (e.g., filtered water) through an intake valve and generates a high pressure liquid stream, e.g., a stream pressurized to about 90,000 psi. The intensifier pump 104 provides pressurized liquid to the attenuator 108, which is included in the top deck 116. The attenuator 108 dampens pressure fluctuations in the liquid to ensure a smooth and even flow of liquid. The pressurized liquid also flows through a bleed-down valve 112 in the pump 100. The bleed-down valve 112 prevents pressurized liquid from accumulating in the pump 100 when the pump 100 is turned off. The pressurized liquid is then provided to a tool (not shown) that can be used for cutting, cleaning, or another desired application.

Figure 2:
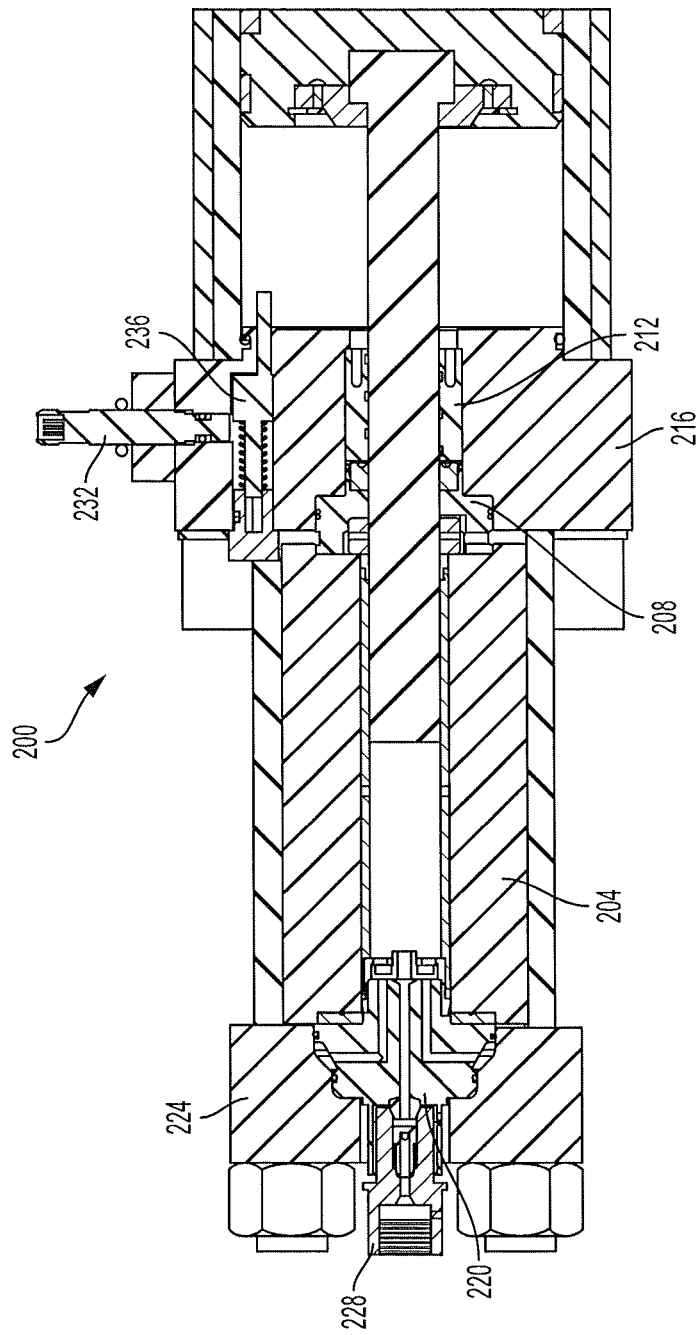
FIG. 2 is a schematic illustration of a portion of a high-pressure intensifier pump included in a pump of a liquid pressurization system, according to an illustrative embodiment of the invention.

FIG. 2 is a schematic illustration of a high-pressure intensifier pump 200 for a liquid pressurization system, according to an illustrative embodiment of the invention. The high-pressure intensifier pump includes standard replaceable pump components such as a cylinder 204, a hydraulic seal housing 208, a plunger bearing 212, a hydraulic end cap 216, a check valve body 220, a high pressure end cap 224, an output adapter 228, a proximity switch 232 and an indicator pin 236. One having ordinary skill in the art will recognize that each of these standard pump components will require replacement after its useful life has been expended. One having ordinary skill in the art will also recognize that the replaceable components shown are exemplary and that other pump components can also be replaceable as described herein. The description of FIGS. 3A-3B below demonstrates how replaceable components such as those shown in FIG. 2 operate in the invention described herein, while FIGS. 4-11 show illustrative implementations of the specific replaceable components described herein.

Figure 3A:
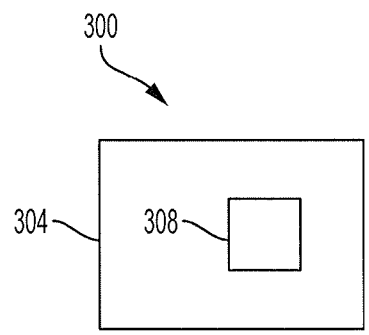
FIG. 3A is a schematic illustration of a replaceable component for a liquid pressurization system, according to an illustrative embodiment of the invention.
Figure 3B:
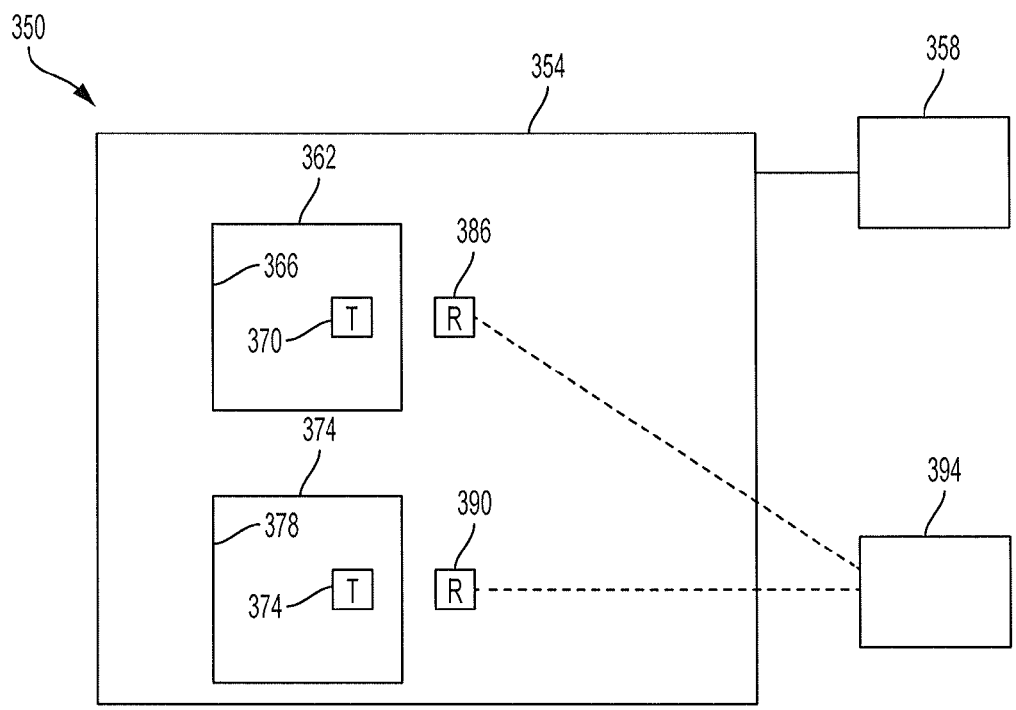
FIG. 3B is a schematic illustration of a liquid pressurization system capable of "intelligent" batch replacement of replaceable pump components, according to an illustrative embodiment of the invention.

FIG. 3A is a schematic illustration of a replaceable component 300 for a liquid pressurization system (e.g. the liquid pressurization system 350 shown and described in FIG. 3B), according to an illustrative embodiment of the invention. The replaceable component 300 includes a body portion 304 and a data storage mechanism 308. The data storage mechanism 308 is in physical communication (e.g., direct physical contact) with the body portion 304 of the replaceable component 300. The data storage mechanism 308 includes information that is usable to determine a remaining useful life of the replaceable component 300. The data storage mechanism 308 is configured to communicate the information to a reader of a liquid pressurization system (e.g., the readers 386, 390 of the liquid pressurization system 350 shown and described in FIG. 3B). In some embodi-ments, the data storage mechanism 308 is a RFID tag and is configured to communicate with a RFID reader. In some embodiments, the body portion 304 of the replaceable component 300 has a connection mechanism for coupling to a liquid pressurization system 350 (e.g., the liquid pressurization system 350 shown and described in FIG. 3B). In some embodiments, the replaceable component 300 includes an assembly of components or sub-components.

In some embodiments, the information includes a number of hours of operation for the replaceable component 300. In some embodiments, the information includes values measuring other suitable metrics of use of the replaceable component 300, e.g., a number of operational cycles, a number of pressure cycles, a time of operation, a number of pump starts, a measure of detected strain, a measure of fluid exposure, and/or another suitable metric. In some embodiments, the information identifies a type of replaceable component 300 installed and/or a time of installation. In some embodiments, the information conveys an identity of the replaceable component 300, e.g., reflects a part type, a part number, a unique part identifier, and/or an expected life for the replaceable component 300.

In some embodiments, the data storage mechanism 308 includes a sensor (e.g., a temperature sensor, a moisture sensor, and/or a humidity sensor) that provides data about an operating condition of interest (e.g., a sensed temperature, moisture, humidity, and/or a leakage factor) within or near the replaceable component 300. In some embodiments, the data storage mechanism 300 stores values of an operating condition of the replaceable component 300 over time. In some embodiments, data provided by the sensor can be stored directly on the data storage mechanism 308. In some embodiments, the information is capable of being updated and/or supplemented at periodic intervals. In some embodiments, the information is also usable to determine when to replace the replaceable component 300.

In some embodiments, component life can be more accurately predicted when environmental information is known. For example, most high pressure components fail in large part due to fatigue from pressure cycling of the intensifier. A number of pressure cycles of the intensifier and an amplitude of these cycles can be strong predictors of life. For example, a high pressure component cycled several million cycles at 40,000 psi may have 50% life left, whereas the same component cycled at 60,000 psi may be near the end of its expected life. Temperature can be a useful predictor of expected life as well. When a component begins to fail it often allows small amounts of high pressure water to leak by a surface. This leak can generate tremendous heat. As explained herein, a sensor located near the component can detect a rise in temperature, and a moisture sensor can detect the presence of moisture. A reader can then use that information and determine an expected remaining life of the component (e.g., by comparing component life information to tabulated data and/or by using an algorithm to determine remaining life). Usage of tags and readers allows for bulk collection of life and environmental data (e.g., using the "cloud" or remote data storage and processing power, in addition to other methods known in the art). Bulk data can in turn be used to further refine the life prediction models. In some embodiments, the data storage mechanism 308 is located in a low pressure region of the replaceable component 300 or another strategic location. In some embodiments, any metal located between the tag and reader is minimized or eliminated. In some embodiments, the data storage mechanism 308 is located in a low pressure region to prevent it from being damaged and/or corrupted by exposure to high pressures and cycles.

FIG. 3B is a schematic illustration of a liquid pressurization system 350 capable of monitoring replaceable component life and condition as well as "intelligent" batch replacement of replaceable pump components (e.g., one or more replaceable components 300 shown and described in FIG. 3A), according to an illustrative embodiment of the invention. The liquid pressurization system 350 includes a pump 354 (e.g., the pump 100 shown and described in FIG. 1) and a tool 358 for delivering a pressurized liquid. The pump 354 is fluidly connected to the tool 358 and provides a pressurized liquid to the tool 358 for a desired high-pressure application. In some embodiments, the tool 358 is a cutting head, a cleaning device, a pressure vessel and/or an isostatic press. In some embodiments, the tool 358 includes a high pressure liquid inlet and/or an abrasive inlet.

The pump 354 includes a first replaceable component 362 (e.g., the replaceable component 300 shown and described in FIG. 3A). The first replaceable component 362 includes a body portion 366 and a first data storage mechanism 370 in physical contact with the body portion 366. The pump 354 also includes a first reader 386. The first reader 386 can be attached to a non-replaceable portion of the pump 354. The first reader 386 reads information on the first data storage mechanism 370. The information is usable to determine a replacement schedule for the first replaceable component 362.

The liquid pressurization system 350 includes a computing device 394 in communication with the first reader 386. The computing device 394 determines a replacement schedule based on information read from the first data storage mechanism 370. For example, information on the first data storage mechanism 370 can reflect a number of use hours that the first replaceable component 362 has been in operation. The computing device 394 stores expected life information for the first replaceable component 362, e.g., an expected number of use hours that the replaceable component will last before replacement is needed. The computing device 394 compares the information to the expected life information. Comparisons can be performed periodically, e.g., daily and/or at user-specified times.

The computing device 394 generates an alert when the number of use hours approaches the expected life. For example, if the first replaceable component 362 has an expected life of 3,000 use hours, the computing device 394 can generate a user alert when it determines that the first replaceable component 362 has been used for 2,700 hours, or 90% of its expected use life. Generally speaking, replaceable components for high pressure liquid delivery systems can last between about 500 to 3,000 use hours, while some replaceable components last 6,000 or more use hours. In some embodiments, metrics besides use hours (e.g., operational cycles, pressure cycles, and/or other metrics described herein) are used alternatively or in addition to use hours.

In some embodiments, the information reflects identifying information for the first replaceable component 362, e.g., part number, a unique part identifier, and/or an expected life. The first reader 386 then reads the information and/or relays the information to the computing device 394. In some embodiments, the computing device 394 records a time of installation of the replaceable component and tracks a number of use hours that the component is run. In some embodiments, tracking can occur on board the computing device 394. In some embodiments, the computing device 394 generates an alert substantially as described above, e.g., when the first replaceable component 362 has expended a certain predetermined threshold of its expected life.

In some embodiments, the first reader 386 can both read from and write to the first data storage mechanism 370. In some embodiments, information is read from and/or written to the first data storage mechanism 370 using the computing device 394. In some embodiments, the computing device 394 includes a computer numeric controller (CNC) or a pump programmable logic controller (PLC). In some embodiments, the pump 354 includes a connector that is connected to the reader 386 and is configured to transmit information to the computing device 394. In some embodiments, the connector is configured to convert information from an analog format to a digital format. In some embodiments, the computing device 394 is wirelessly connected to the first reader 386. In some embodiments, the computing device 394 is located on the pump 354 or remotely. In some embodiments, the computing device 394 is configured to set or adjust at least one operating parameter of the liquid pressurization system based on the information relayed by the first reader 386. For example, an operating pressure could be reduced, and/or a cutting speed slowed down, to extend the life of the component to allow completion of a job or process.

In some embodiments, the first replaceable component 362 includes a sensor (e.g., on the RFID tag or elsewhere) (e.g., to sense temperature, moisture and/or humidity). In some embodiments, the sensor is a temperature sensor. In some embodiments, the first data storage mechanism 370 includes a RFID tag having sensing capabilities. In some embodiments, sensor data can be stored on the first data storage mechanism 370 (e.g., a RFID tag). In some embodiments, a temperature sensor can use the RF capability of the RFID tag to pass information to the RFID reader and upstream to the computing device 394, where it can be used to predict the end of the life of the first replaceable component 362. In some embodiments, the first data storage mechanism 370 stores values of an operating condition over time. In some embodiments, the operating condition is one of a temperature, a pressure, a leakage indicator, moisture information, a number of pressure cycles, a number of operational cycles, a time of operation, a number of pump starts, and/or a measure of detected strain on the first replaceable component 362. In some embodiments, the liquid pressurization system 350 automatically resets the predicted life of the first replaceable component 362 after a new part is installed.

In some embodiments, the liquid pressurization system 350 includes a plurality of replaceable components, data storage mechanisms, and/or readers. For example, in some embodiments the liquid pressurization system 350 includes a second replaceable component 374 and a second reader 390 also in communication with the computing device 394. The second replaceable component 374 includes a body portion 378 and a second data storage mechanism 382 in physical contact with the body portion 378. In some embodiments, the second data storage mechanism 382 is configured to communicate with the second reader 390, e.g., is readable and/or writable by the second reader 390. The information is usable to determine a remaining usable life of the second replaceable component 374. In some embodiments, the second data storage mechanism 382 communicates with the first reader 386, e.g., is readable and/or writable by the first reader 386.

In some embodiments, the computing device 394 determines a replacement schedule for two or more replaceable components (e.g., the replaceable components 362, 374)

based on information relayed from multiple replaceable components. In one exemplary embodiment, the first replaceable component 362 is a brand new high pressure cylinder, which can be expected to last about 6,000 use hours, and the second replaceable component 374 is a brand new seal cartridge, which can be expected to last about 650 use hours. In this embodiment, assuming that a seal cartridge is replaced after 650 hours each time it fails, the system will need to be shut down eight times to install new seal cartridges without having to replace the high pressure cylinder. However, at the ninth replacement, the system can also recommend changing the high pressure cylinder to prevent an unneeded system shutdown, as this component would likely fail before the tenth replacement of the seal cartridge. More frequent replacements are needed for configurations that recommend replacements when components reach a certain specified fraction of their expected useful lives, e.g., 90% of their expected useful lives. This example embodiment may also contain a third replaceable component that is a check valve body, which can be expected to last about 3,000 use hours. In such a configuration, at the fourth dynamic seal cartridge failure, the system can recommend that the end user also replace the check valve body to prevent another system shutdown.

The system 350 can use data collected over time to improve batch replacement recommendations. For example, as certain replaceable components fail repeatedly, corresponding information can be recorded and averaged over time to produce better estimates of part life (e.g., by tracking the number of use hours of the components before failure, the amplitude of the pressure cycles experienced by the components before failure, or other relevant metrics). In some embodiments, the replaceable components can be any of those described specifically below in FIGS. 4-11. The system 350 can also implement a process as shown and described below in FIG. 12.

FIGS. 4-11 show exemplary key locations in a pump of a liquid pressurization system to which data storage mechanisms and readers can be attached. Data storage mechanisms are denoted with the letter "T" (e.g., a RFID "tag"); readers are denoted by the letter "R" (e.g. "reader"). Generally, tags are placed on replaceable components, and readers are placed on a non-replaceable portion of the pump. The readers can be placed in close proximity to the tags with which they interact to ensure effective communication. One of ordinary skill in the art will realize that it is possible to place tags and readers in additional locations without departing from the spirit and scope of the invention. Table 1 at the end of this description summarizes the exemplary key components and their respective RFID tag and reader locations as shown in FIGS. 4-11. The data storage mechanisms and tags shown in FIGS. 4-11 can function substantially as shown and described above, e.g., in reference to FIGS. 3A-3B.

Figure 4:
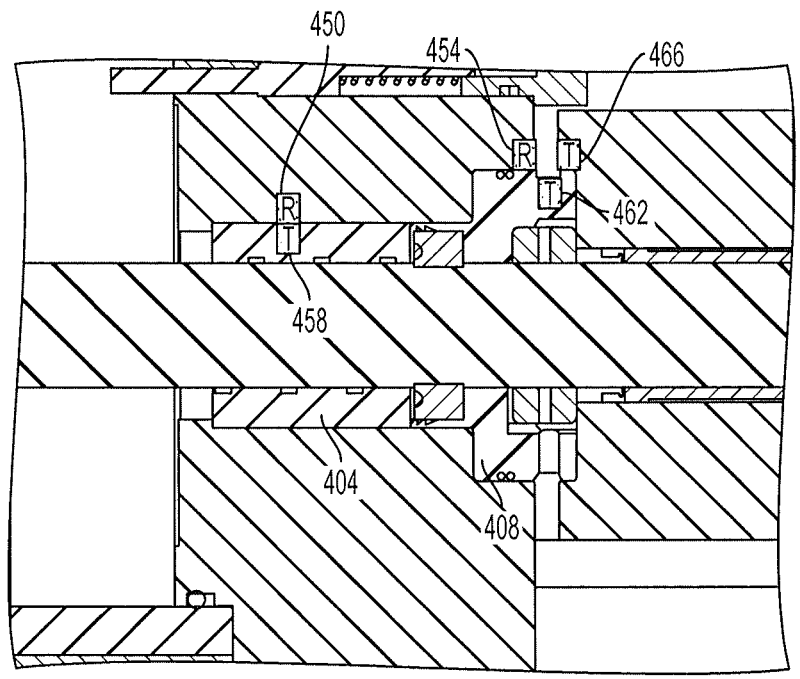
FIG. 4 is a schematic illustration of a hydraulic seal housing and plunger bearing of a pump for a liquid pressurization system, according to an illustrative embodiment of the invention.

FIG. 4 is a schematic illustration of a plunger bearing 404 (e.g. plunger bearing 212 shown above in FIG. 2) and a hydraulic seal housing 408 (e.g. hydraulic seal housing 208 shown above in FIG. 2) of a pump (e.g. a pump including intensifier pump 200 as shown above in FIG. 2) for a liquid pressurization system including RFID readers and tags, according to an illustrative embodiment of the invention. The plunger bearing 404 includes a RFID tag 458. The hydraulic seal housing 408 includes RFID tags 462, 466. The pump includes RFID readers 450, 454. In some embodiments, the RFID readers 450, 454 are attached to a non-replaceable portion of the pump. In some embodiments, the RFID reader 450 communicates with the RFID tag 458. In some embodiments, the RFID reader 454 communicates with the RFID tags 462, 466. In some embodiments, tags are located on replaceable parts and readers are located on non-replaceable portions of a pump subcomponent. In some embodiments, readers and tags are located in low pressure region of pump subcomponents.

Figure 5:
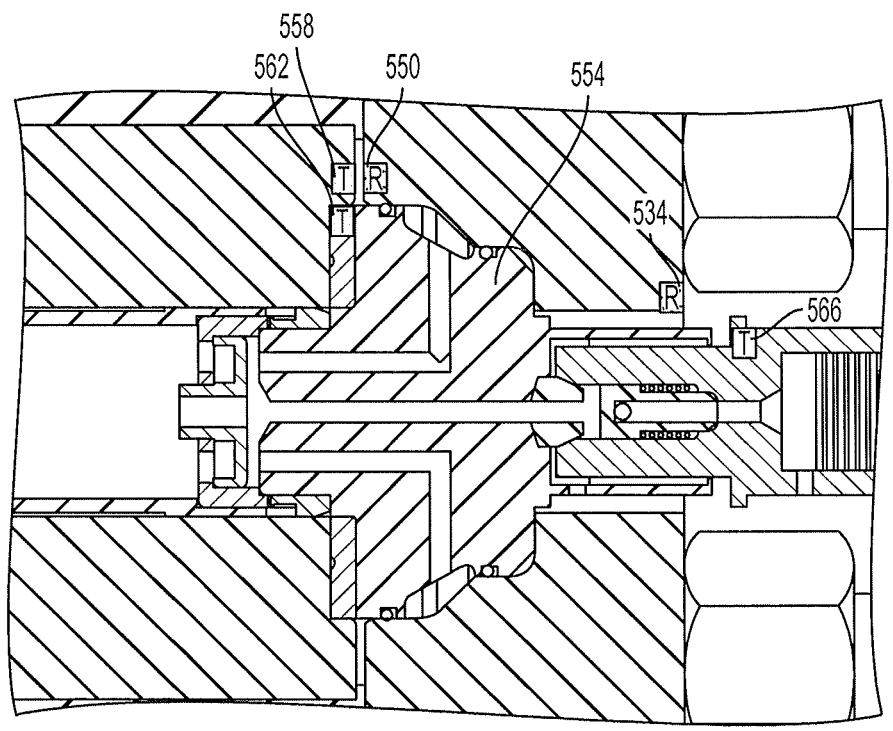
FIG. 5 is a schematic drawing of a check valve of a pump for a liquid pressurization system, according to an illustrative embodiment of the invention.

FIG. 5 is a schematic drawing of a check valve 504 of a pump (e.g. a pump including intensifier pump 200 as shown above in FIG. 2) of a liquid pressurization system including RFID readers and tags, according to an illustrative embodiment of the invention. The check valve 504 includes the tags 558, 562, and/or 566. The pump includes the readers 550, 554. In some embodiments, the reader 554 communicates with the tag 566. In some embodiments, the reader 550 communicates with the tags 558, 562. In some embodiments, the check valve 504 is a single replaceable component which contains the tag(s). In some embodiments, the check valve 504 is an assembly of components. In some embodiments, the tags may be on any one or more of the individual replaceable components.

Figure 6:
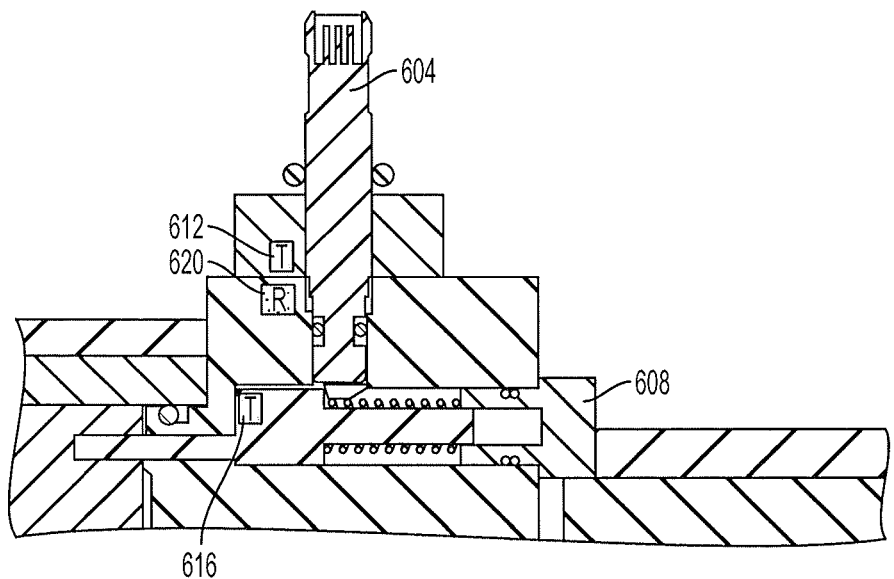
FIG. 6 is a schematic drawing of a proximity switch and an indicator pin of a pump for a liquid pressurization system, according to an illustrative embodiment of the invention.

FIG. 6 is a schematic drawing of a proximity switch 604 and an indicator pin 608 of a pump (e.g. a pump including intensifier pump 200 as shown above in FIG. 2) for a liquid pressurization system including RFID readers and tags, according to an illustrative embodiment of the invention. The proximity switch 604 includes a tag 612. The indicator pin 608 includes a tag 616. The pump includes a reader 620. In some embodiments, the reader 620 communicates with the tag 612 and/or the tag 616.

Figure 7:
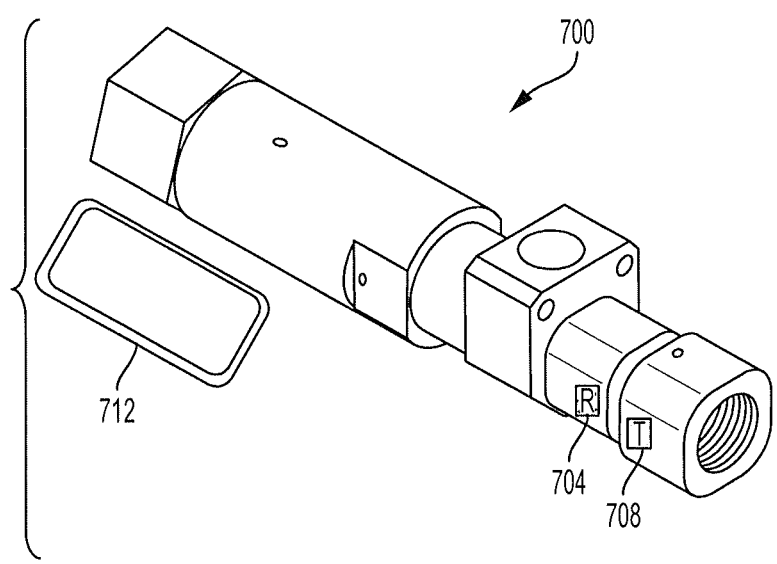
FIG. 7 is a schematic drawing of a bleed down valve of a pump for a liquid pressurization system, according to an illustrative embodiment of the invention.

FIG. 7 is a schematic drawing of a bleed down valve 700 of a pump (e.g. the pump 100 as shown above in FIG. 1) for a liquid pressurization system, according to an illustrative embodiment of the invention. The bleed down valve 700 includes a RFID reader 704, a RFID tag 708, and a reader board 712. In some embodiments, the reader 704 communicates with the tag 708. In some embodiments, the bleed down valve 700 is an assembly of replaceable components. In some embodiments, the reader board 712

Figure 8:
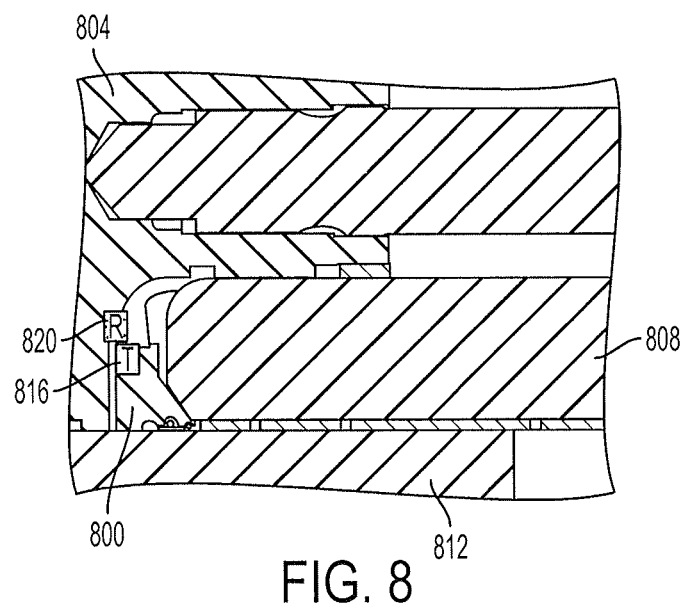
FIG. 8 is a schematic drawing of a seal cartridge, a hydraulic end cap, a high pressure cylinder, and a plunger for a pump for a liquid pressurization system, according to an illustrative embodiment of the invention.

FIG. 8 is a schematic drawing of a seal cartridge 800, a hydraulic end cap 804, a high pressure cylinder 808 and a plunger 812 of a pump (e.g. a pump including intensifier pump 200 as shown above in FIG. 2) for a liquid pressurization system including a RFID reader and tag, according to an illustrative embodiment of the invention. The seal cartridge 800 includes a tag 816. The pump includes a reader 820. In some embodiments, the tag 816 communicates with the reader 820.

Figure 9:
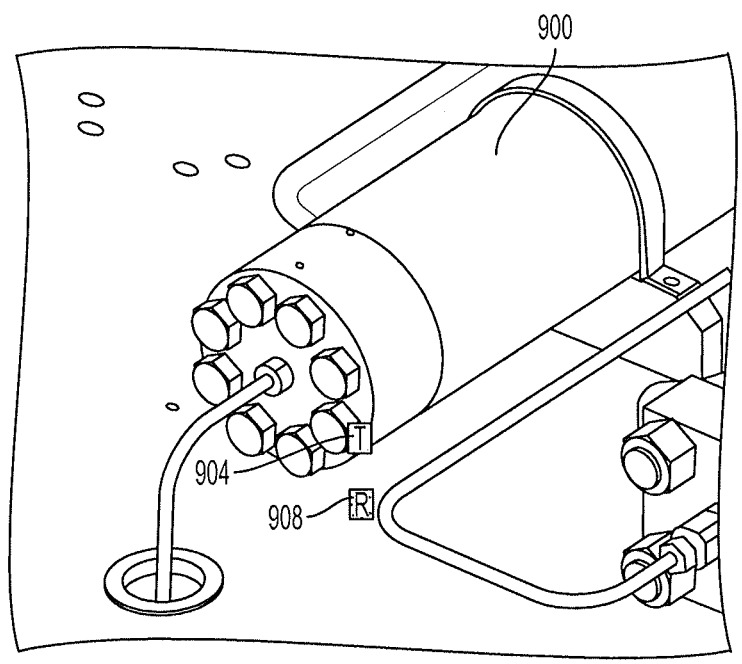
FIG. 9 is a schematic drawing of an attenuator for a pump for a liquid pressurization system, according to an illustrative embodiment of the invention.

FIG. 9 is a schematic drawing of an attenuator 900 (e.g. the attenuator 108 as described above in FIG. 1) for a pump for a liquid pressurization system including a RFID reader and tag, according to an illustrative embodiment of the invention. The attenuator 900 includes a tag 904. The pump includes a reader 908. In some embodiments, the reader 908 communicates with the tag 904.

Figure 10:
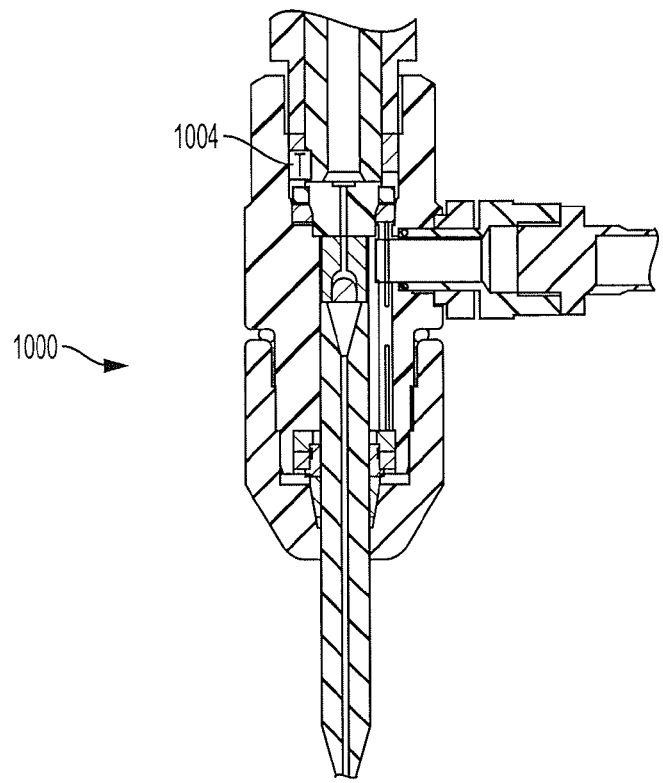
FIG. 10 is a schematic drawing of a cutting head and an adapter for a pump for a liquid pressurization system, according to an illustrative embodiment of the invention.

FIG. 10 is a schematic drawing of a cutting head and adapter, collectively 1000, for a pump for a liquid pressurization system including RFID readers and tags, according to an illustrative embodiment of the invention. The cutting head and adapter 1000 include a tag 1004. The tag 1004 is in communication with a reader (not shown).

Figure 11:
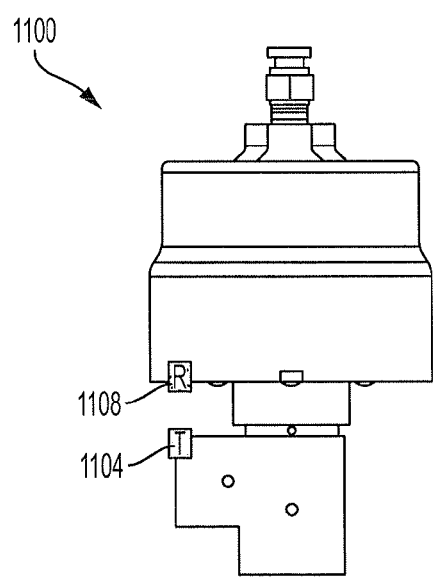
FIG. 11 is a schematic drawing of an on/off valve body for a pump for a liquid pressurization system, according to an illustrative embodiment of the invention.

FIG. 11 is a schematic drawing of an on/off valve body 1100 for a pump (e.g. the pump 100 as described above in FIG. 1) for a liquid pressurization system including a RFID reader and tag, according to an illustrative embodiment of the invention. The valve body 1100 includes a tag 1104. The pump includes a reader 1108. In some embodiments, the reader 1108 is in communication with the tag 1104.

Figure 12:
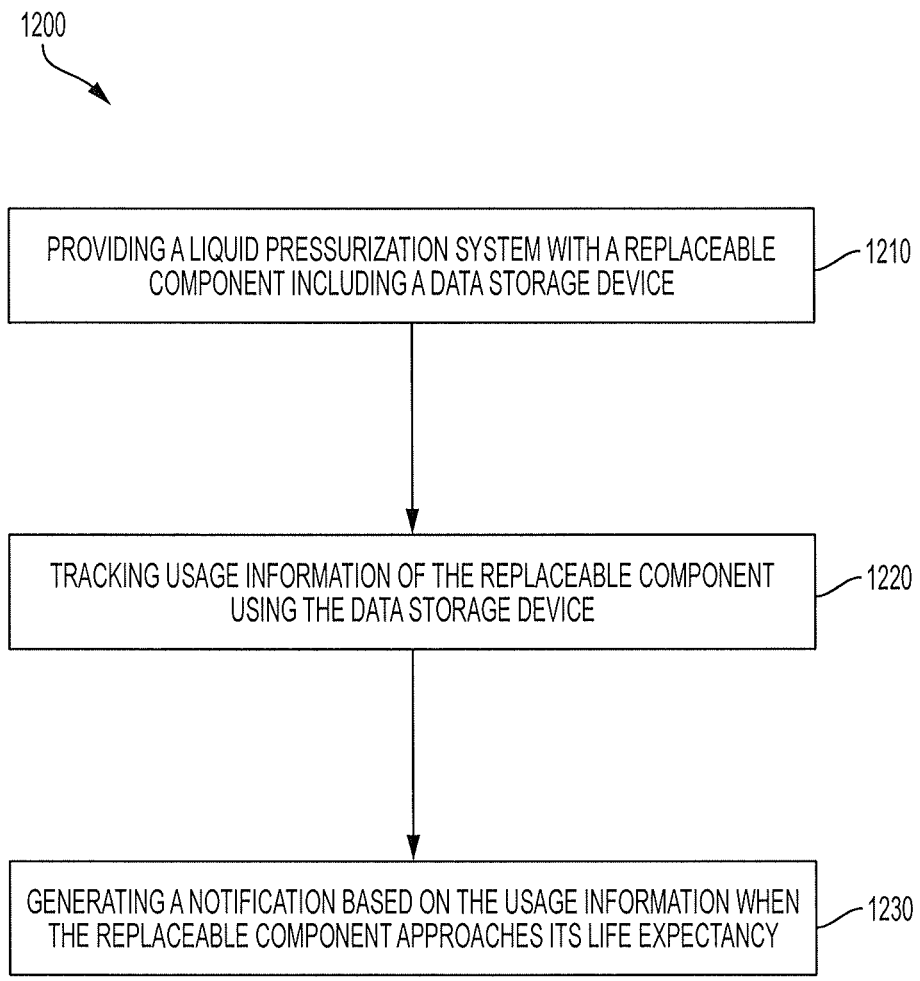
FIG. 12 is a schematic diagram of a process for scheduling a service event for a liquid pressurization system, according to an illustrative embodiment of the invention.

FIG. 12 is a schematic diagram of a process 1200 for scheduling a service event for a liquid pressurization system (e.g., the liquid pressurization system 350 shown and described above in FIG. 3B), according to an illustrative embodiment of the invention. The process 1200 includes a step 1210 of providing a liquid pressurization system with a replaceable component including a data storage device. The process 1200 further includes a step 1220 of tracking usage information of the replaceable component using the data storage device. The process 1200 further includes a step 1230 of generating a notification based on the usage information when the replaceable component approaches its life expectancy.

In some embodiments, the process 1200 further includes comparing the usage information of the replaceable component to life expectancy information for the replaceable component. In some embodiments, the notification is generated after the replaceable component expends at least a certain threshold of its life expectancy, e.g., at least 90% of its life expectancy. In some embodiments, life expectancy is measured in hours of operation. In some embodiments, life expectancy is measured in, or is affected by, another suitable metric, e.g., as described herein or as is known in the art. In some embodiments, comparing usage information with expected life information includes comparing specific values for each relevant use metric with tabulated values reflecting the expected life for the replaceable component. In some embodiments, the tabulated expected life values are updated and/or iteratively better defined as further data are gathered over time. In some embodiments usage data is run through an algorithm to determine remaining life. In some embodiments, tracking usage information includes recording data on the data storage device and/or reading data from the data storage device. Recording can be accomplished using the "reader" to write information to a tag and/or by storing the information remotely.

In some embodiments, the process further includes (v) providing a plurality of replaceable components on or in the liquid pressurization system, each replaceable component including a data storage device for tracking usage information for each replaceable component. In some embodiments, the method further includes (vi) planning an outage of the liquid pressurization system based on usage information for the plurality of replaceable components. In some embodiments, the method further includes (vii) determining whether each of the plurality of replaceable components should be replaced during a given outage based on the usage information for each replaceable component. For example, when one replaceable component fails and necessitates a system shut-down, the method can include further determining whether any other replaceable components should be replaced during that outage. In some embodiments, operating parameters of the system (e.g., cutting pressure and speed) can be adjusted to suboptimal levels to complete the cut while the system is fading (e.g., akin to a "battery save" mode on a laptop).

Component replacement schemes can be determined using a cost optimization algorithm that accounts for the total costs of replacement over time and schedules batch replacements that minimize these costs. Several considerations may inform such an algorithm. On the one hand, fixed costs are incurred each time a batch replacement is performed, including costs to pay repair personnel and costs of lost productivity while the system is down. This consideration weighs in favor of batching replacement of components to the extent possible. On the other hand, there is also a cost of "wasted" materials associated with replacing components that still have a useful life remaining. These costs accumulate over time if many components are not used to their full potential. This consideration weighs in favor of keeping components in place as long as possible, e.g., if they are likely to survive until the next replacement cycle.

In some embodiments, cost variables may be multiplied by a probability factor that represents the likelihood of incurring the cost, e.g., since failure of replaceable components cannot be predicted with absolute certainty. For example, if a component is 80% likely to fail before the next batch replacement, this likelihood should be taken into account. As more data is gathered over time, trends can be analyzed to build an iteratively better understanding of the variables influencing useful life, the quantitative values of useful life along certain metrics (e.g., the expected use hours for a particular replaceable component), and the variance in these values (e.g., useful life for component X is 95% likely to be 3000 hours, plus or minus 50 hours). This better understanding will, in turn, help shed light on which metrics more reliably determine useful life. The process of iterative refinement will continue until a stable probabilistic assessment of failure for a given set of replaceable components is reached.

While the invention has been particularly shown and described with reference to specific preferred embodiments, it should be understood by those skilled in the art that various changes in from and detail may be made therein without departing from the spirit and scope of the invention as defined by the following claims.

TABLE 1

Summary of exemplary key components and their respective RFID tag and reader locations as shown in FIGS. 4-11.

| Figure | Component with RFID | Reader Location |
| --- | --- | --- |
| FIG. 4 | Cylinder | High pressure end cap or hydraulic end cap |
| FIG. 4 | Hydraulic Seal Housing | Hydraulic end cap |
| FIG. 4 | Hydraulic Seal Housing | Hydraulic end cap |
| FIG. 4 | Plunger bearing | Hydraulic end cap |
| FIG. 5 | Check Valve | High pressure end cap |
| FIG. 5 | Output adaptor | High pressure end cap |
| FIG. 6 | Proximity Switch | Hydraulic end cap |
| FIG. 6 | Indicator Pin | Hydraulic end cap |
| FIG. 7 | Bleed down valve | Top deck |
| FIG. 8 | 90,000 PSI Seal Cartridge | Hydraulic end cap |
| FIG. 9 | Attenuator | Top deck |
| FIG. 10 | Cutting Head Adapter | Cutting Head with RFID |
| FIG. 11 | On/Off Valve Body | Valve Actuator |

What is claimed is:

1. A replaceable component for use in a pump of a liquid pressurization system, the replaceable component comprising:
   a body portion; and
      a data storage mechanism in physical contact with the body portion, the data storage mechanism configured to communicate information to a reader of the liquid pressurization system, the information usable to determine a remaining usable life of the replaceable component,
      wherein the replaceable component is one of a seal assembly, a check valve, a hydraulic seal cartridge, or a cylinder.

2. The replaceable component of claim 1 wherein the condition of the replacement is a remaining usable life is measured in hours of operation.

3. The replaceable component of claim 1 wherein the replaceable component is for use in a liquid jet cutting system, an isostatic press or a pressure vessel.

4. The replaceable component of claim 1 wherein the information denotes a type replaceable component.

5. The replaceable component of claim 1 wherein the data storage mechanism is a radio frequency identification mechanism.

6. The replaceable component of claim 1 wherein the data storage mechanism is configured to record a number of pressure cycles to which the replaceable component has been exposed.

7. The replaceable component of claim 1 wherein the information includes a period of use for the replaceable component.

8. The replaceable component of claim 1 wherein the information includes a condition of use for the replaceable component.

9. A replaceable component for use in a pump of a liquid pressurization system, the replaceable component comprising:
   a body portion; and
   a data storage mechanism in physical contact with the body portion, the data storage mechanism configured to communicate information to a reader of the liquid pressurization system, the information usable to determine a remaining usable life of the replaceable component;
   wherein the data storage mechanism is configured to automatically set at least one operating parameter of the liquid jet cutting system.

10. A replaceable component for use in a pump of a liquid pressurization system, the replaceable component comprising:
    a body portion; and
    a data storage mechanism in physical contact with the body portion, the data storage mechanism configured to communicate information to a reader of the liquid pressurization system, the information usable to determine a remaining usable life of the replaceable component;
    wherein the body portion includes a connection mechanism for coupling the body portion to the liquid jet cutting system.

11. A replaceable component for use in a pump of a liquid pressurization system, the replaceable component comprising:
    a body portion; and
    a data storage mechanism in physical contact with the body portion, the data storage mechanism configured to communicate information to a reader of the liquid pressurization system, the usable to determine a remaining usable life of the replaceable component;
    wherein the data storage mechanism is located in a low pressure region of the replaceable component.

12. The replaceable component of claim 1 wherein the replaceable component includes a sensor.

13. A replaceable component for use in a pump of a liquid pressurization system, the replaceable component comprising:
    a body portion; and
    a data storage mechanism in physical contact with the body portion, the data storage mechanism configured to communicate information to a reader of the liquid pressurization system, the information usable to determine a remaining usable life of the replaceable component;
    wherein the replaceable component includes a temperature sensor.

14. The replaceable component of claim 1 wherein the reader is configured to write to the data storage mechanism.

15. The replaceable component of claim 14 wherein the data storage mechanism stores specific values of an operating condition over time.

16. The replaceable component of claim 15 wherein the operating condition is one of temperature, pressure, leakage, moisture information and number of pressure or operational cycles.

17. The replaceable component of claim 1 wherein the information comprises at least one of temperature, pressure, a number of operational cycles, a time of operation, a number of pump starts, or a measure of detected strain on the replaceable component.

18. A liquid pressurization system comprising:
    a tool for delivering a pressurized liquid;
    a pump fluidly connected to the tool, the pump including:
      a replaceable component having a data storage mechanism including information about the replaceable component;
      a reader in communication with the data storage mechanism for reading the information; and
      a computing device in communication with the reader, the computing device determining a replacement schedule for the replaceable component based on the information,
      wherein the computing device is configured to adjust operating parameters of the liquid jet cutting system based on the information.

19. The liquid pressurization system of claim 18 wherein the reader is configured to write data to the data storage mechanism.

20. The liquid pressurization system of claim 18 wherein the computing device includes at least one of a computer numerical controller or a pump programmable logic controller.

21. The liquid pressurization system of claim 18 wherein the computing device is configured to identify the replaceable component based on the information.

22. The liquid pressurization system of claim 18 wherein the replaceable component includes at least one of a cylinder, a check valve, a plunger bearing, an output adaptor, a proximity switch, a hydraulic seal housing, an attenuator, a bleed down valve, an indicator pin, a dynamic seal cartridge, a cutting head adapter, or an on/off valve body.

23. The liquid pressurization system of claim 18 wherein the data storage mechanism is a radio frequency identification mechanism.

24. The liquid pressurization system of claim 18 wherein the tool is a cutting head.

25. A liquid pressurization system comprising:
    a tool for delivering a pressurized liquid;
    a pump fluidly connected to the tool, the pump including:
      a replaceable component having a data storage mechanism including information about the replaceable component;
      a reader in communication with the data storage mechanism for reading the information; and
      a computing device in communication with the reader, the computing device determining a replacement schedule for the replaceable component based on the information;
    wherein the tool is a cleaning device.

26. The liquid pressurization system of claim 18 wherein the information denotes a type of replaceable component.

27. The liquid pressurization system of claim 18 wherein the information includes a time of use of the replaceable component.

28. A liquid pressurization system comprising:
a tool for delivering a pressurized liquid;
a pump fluidly connected to the tool, the pump including:
a replaceable component having a data storage mechanism including information about the replaceable component; a reader in communication with the data storage mechanism for reading the information; and
a computing device in communication with the reader, the computing device determining a replacement schedule for the replaceable component based on the information; and
further comprising a connector disposed on the pump and connected to the reader, the connector configured to transmit the information to a computer numeric controller of the liquid jet cutting system.

29. The liquid pressurization system of claim 28 wherein the connector is further configured to convert the information from an analog format to a digital format.

30. The liquid pressurization system of claim 18 further comprising an intensifier operably connected to the pump.

31. The liquid pressurization system of claim 30 further comprising an accumulator fluidly connected to the intensifier.

32. A liquid pressurization system comprising:
a tool for delivering a pressurized liquid;
a pump fluidly connected to the tool, the pump including:
a replaceable component having a data storage mechanism including information about the replaceable component;
a reader in communication with the data storage mechanism for reading the information; and
a computing device in communication with the reader, the computing device determining a replacement schedule for the replaceable component based on the information;
wherein the replacement schedule is coordinated with replacement schedules of other replaceable components of the liquid jet cutting system.

33. The liquid pressurization system of claim 18 further including a second replaceable component including a second data storage mechanism, wherein the second data storage mechanism is in communication with the reader.

34. The liquid pressurization system of claim 18 wherein the communication is two-way communication.

* * * * *